US012460026B2

(12) United States Patent
Chauhan et al.

(10) Patent No.: US 12,460,026 B2
(45) Date of Patent: Nov. 4, 2025

(54) PROCESS FOR PREPARING FLUOROPOLYMERS AND FLUOROELASTOMERS IN PRESENCE OF A NON FLUORINATED SULFONATE TYPE HYDROCARBON CONTAINING SURFACTANT THEREOF

(71) Applicant: GUJARAT FLUOROCHEMICALS LIMITED, Noida (IN)

(72) Inventors: Rajeev Chauhan, Bharuch (IN); Gaurav Kumar, Bharuch (IN); P. S. Rao, Bharuch (IN); Navin Soni, Bharuch (IN); B. S. Bhattacharya, Bharuch (IN); Anamika Dutta, Bharuch (IN); Akanksha Shukla, Bharuch (IN); Anand Mohan Patel, Bharuch (IN)

(73) Assignee: GUJARAT FLUOROCHEMICALS LIMITED, Noida (IN)

( * ) Notice: Subject to any disclaimer, the term of this patent is extended or adjusted under 35 U.S.C. 154(b) by 857 days.

(21) Appl. No.: 17/767,103

(22) PCT Filed: Oct. 12, 2020

(86) PCT No.: PCT/IB2020/059569
§ 371 (c)(1),
(2) Date: Apr. 7, 2022

(87) PCT Pub. No.: WO2021/070159
PCT Pub. Date: Apr. 15, 2021

(65) Prior Publication Data
US 2022/0372179 A1 Nov. 24, 2022

(30) Foreign Application Priority Data
Oct. 11, 2019 (IN) .............................. 201911041309

(51) Int. Cl.
*C08F 14/26* (2006.01)
*C08F 2/26* (2006.01)

(52) U.S. Cl.
CPC .............. *C08F 14/26* (2013.01); *C08F 2/26* (2013.01)

(58) Field of Classification Search
CPC ............. C08F 14/18; C08F 14/26; C08F 2/26
See application file for complete search history.

(56) References Cited

U.S. PATENT DOCUMENTS

| 6,743,764 | B1 * | 6/2004 | Wallick | C11D 1/24 |
| | | | | 510/428 |
| 8,809,471 | B2 * | 8/2014 | Amin-Sanayei | C08F 14/18 |
| | | | | 526/225 |
| 9,255,164 | B2 | 2/2016 | Brothers et al. | |
| 2007/0276068 | A1 * | 11/2007 | Hintzer | C09D 127/18 |
| | | | | 524/502 |
| 2008/0114121 | A1 * | 5/2008 | Brothers | C08F 14/18 |
| | | | | 524/599 |
| 2012/0116003 | A1 * | 5/2012 | Brothers | C08F 2/16 |
| | | | | 524/394 |
| 2013/0150519 | A1 | 6/2013 | Durali et al. | |
| 2019/0284428 | A1 * | 9/2019 | Carella | C09D 127/16 |
| 2022/0081494 | A1 * | 3/2022 | Gupta | C08F 2/26 |
| 2023/0151122 | A1 * | 5/2023 | Chauhan | C08F 14/18 |
| | | | | 526/250 |

FOREIGN PATENT DOCUMENTS

| JP | 2008297528 A | 12/2008 |
| WO | 2019172382 | 12/2019 |

OTHER PUBLICATIONS

Lopez et al. (Progress in Organic Coatings 116, 2018, 57-69) (Year: 2018).*
PubChem (Disodium 5-dodecyl-2-(4-sulfophenoxy)benzenesulfonate, https://pubchem.ncbi.nlm.nih.gov/compound/Dowfax-2A1) (Year: 2025).*
https://www.pcimag.com/articles/102136-the-use-of-diphenyl-oxide-disulfonate-surfactants; Binh D. Nguyen; Jun. 1, 2016 (Jan. 6, 2016) Whole document.

* cited by examiner

*Primary Examiner* — Liam J Heincer
(74) *Attorney, Agent, or Firm* — Ling Wu; Stephen Yang; Ling and Yang Intellectual Property

(57) ABSTRACT

The present invention relates to a process for preparing fluoropolymers or fluoroelastomers in an aqueous medium using a non fluorinated sulfonate type hydrocarbon containing surfactant, said process comprising the steps of: (a) forming an aqueous solution comprising an non-fluorinated, hydrocarbon containing, sulfonate anionic type surfactant in a polymerization reactor; (b) pressurizing the reactor with fluoromonomers to form an aqueous emulsion; (c) initiating polymerization of said fluoromonomers; and (d) Propagating the reaction (e) Terminating the reaction after consumption of desired weight of fluoromonomers; wherein the non-fluorinated, hydrocarbon containing, sulfonate type surfactant comprises 18 to 36 carbon atoms, wherein the molecular weight of the fluoropolymer ranges from $1 \times 10^3$ to $9 \times 10^8$ g/mol and wherein said process is devoid of passivating the surfactant.

5 Claims, 1 Drawing Sheet

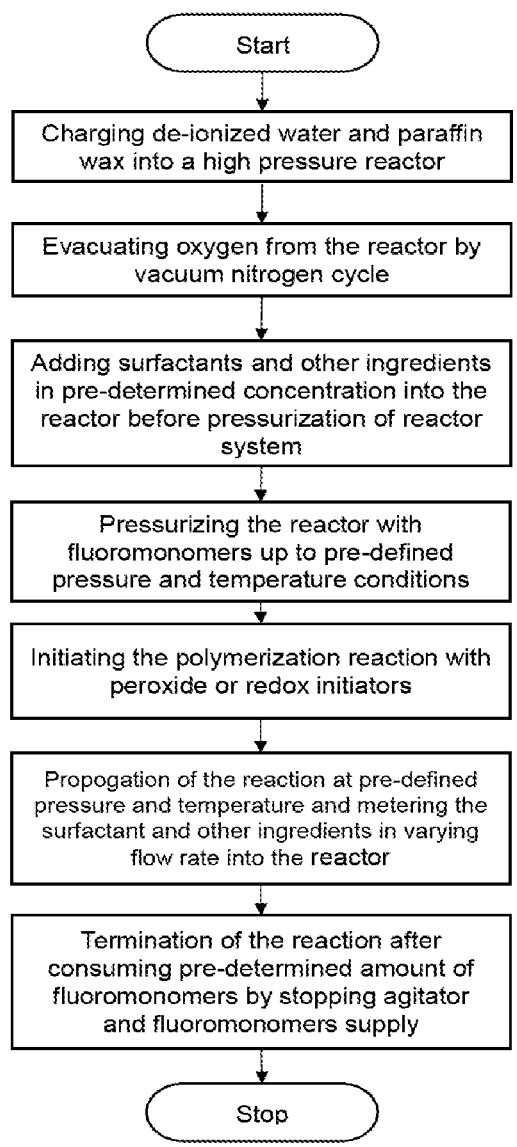

PROCESS FOR PREPARING FLUOROPOLYMERS AND FLUOROELASTOMERS IN PRESENCE OF A NON FLUORINATED SULFONATE TYPE HYDROCARBON CONTAINING SURFACTANT THEREOF

FIELD OF THE INVENTION

The present invention pertains to a method for polymerizing fluoromonomers in presence of a non-fluorinated surfactants to manufacture fluoropolymer and fluoroeastomers using emulsion polymerization technology. More particularly, the present invention relates to a method of aqueous dispersion polymerization in presence of a non fluorinated sulfonate type hydrocarbon containing surfactant.

BACKGROUND OF THE INVENTION

Fluoropolymers and fluoroelastomers represent a class of materials exhibiting extreme chemical resistance and favorable dielectric properties. Consequently, there is an ever-increasing demand for these materials from industries engaged in manufacturing coatings, tapes and tubing, architectural fabric, nonstick and industrial coatings, fluroelastomer hoses for auto industry and sealing, gaskets and liners for chemical industry, insulation wires and cables, lubricants and so forth. This increasing demand in turn is driving a renewed interest in developing environmentally friendly and more efficient routes for manufacturing fluoropolymers and fluoroelastomers. Fluoropolymers and fluoroelastomers are typically synthesized from alkenes in which one or more hydrogen atoms have been replaced by fluorine atom. These include, tetrafluoroethylene (TFE), chlorotrifluoroethylene (CTFE), hexa fluopropylene (HFP), polypropyl vinyl ether (PPVE), polymethyl vinyl ether (PMVE), vinylidene fluoride (VDF), vinylfluoride (VF), etc. Polymerization of the aforesaid monomers affords the corresponding polymers, viz., polytetrafluoroethylene (PTFE), per fluoro alkoxy ether (PFA) polymer, fluorinated ethylene propylene (FEP) polymer, polychlorotrifluoroethylene (PCTFE), polyvinyl fluoride (PVF), polyvinylidene fluoride (PVDF), Fluroelastomers etc.

Fluoropolymers and fluoroelastomers are primarily manufactured via heterogeneous polymerization reactions including aqueous systems. Generally, the reaction requires a monomers and a radical initiator in a suitable aqueous reaction medium. Aqueous dispersion polymerization of fluorine containing monomers typically requires a surfactant capable of emulsifying both the reactants and the reaction products for the duration of the polymerization reaction. As discussed below, the surfactant of choice in the synthesis of fluoropolymers and fluoroelastomers is generally a perfluorinated surfactant or a partially fluorinated surfactant. The most frequently used perfluorinated surfactant in the production of fluoropolymers and fluoroelastomers is Perfluorooctanoic acid (PFOA) salts.

Although, Pefluorosurfactants are better in lowering the surface tension of water than comparable hydrocarbon surfactants, fluorinated surfactants persist in the environment for a longer duration and have been detected in humans and wildlife. Annexure-XVII to REACH, Entry 68, by the European Chemicals Agency, places restrictions on the manufacture, placing on the market and use of certain dangerous substances, mixtures and articles containing Perfluorooctanoic acid (PFOA) and its salts. Further, according to the document there are also restrictions on any related substance (including its salts and polymers) having a linear or branched perfluoroheptyl group with the formula $C_7F_{15}$— directly attached to another carbon atom, as one of the structural elements. Also, the use of any related substance (including its salts and polymers) having a linear or branched perfluorooctyl group with the formula $C_8F_{17}$— as one of the structural elements is restricted. According to the document, the aforementioned, shall not be manufactured, or placed on the market as substances on their own from 4 Jul. 2020. Further, they shall not be used in the production of, or placed on the market in: (a) another substance, as a constituent; (b) a mixture; (c) an article, in a concentration equal to or above 25 ppb of PFOA including its salts or 1000 ppb of one or a combination of PFOA-related substances. Hence, in view of REACH 2020 guidelines of the European Chemicals Agency, there is a need for a process for polymerization of fluoromonomers, which does not involve the use of fluorinated surfactants.

In prior art U.S. Pat. No. 9,255,164, A process is provided for the polymerization of fluoromonomerto an dispersion of fluoropolymer particles in an aqueous medium in a polymerization reactor, by (a) providing the aqueous medium in the reactor, (b) adding the fluoromonomer to the reactor, (c) adding initiator to the aqueous medium, the combination of steps (b) and (c) being carried out essentially free of hydrocarbon-containing Surfactant and resulting in the kickoff of the polymerization of the fluoromonomer, and (d) metering hydrocarbon-containing Surfactant into the aqueous medium after the kickoff of polymerization, e.g. after the concentration of the fluoropolymer in the aqueous medium is at least 0.6 wt %, the metering being at a rate reducing the telogenic activity of said Surfactant while maintaining Surface activity.

Another patent WO2019172382 discloses a method for producing a fluoropolymer, which is capable of reducing the content of impurities. The present invention is a method for producing a fluoropolymer, which is characterized by comprising a polymerization step wherein a fluoropolymer is obtained by carrying out polymerization of a fluoromonomer in an aqueous medium in the presence of a surfactant, and which is also characterized in that the surfactant is a carboxylic acid type hydrocarbon-containing surfactant.

A process for the polymerization of fluoromonomers and fluoroelastomers using a non-fluorinated surfactant would solve the aforestated issues of persistence in the eco-system, bio-accumulation of fluorosurfactants. However, the use of non-fluorinated surfactants in polymerization reaction results in inhibition of the reaction and formation of fluoropolymers with low molecular weights.

In order to prevent inhibition of polymerization, it is essential to degrade the non-fluorinated surfactant prior to kick-off of the polymerization reaction. Degradation of the surfactant using a suitable degradation agent, leads to reduction or elimination of telogenecity. Telogenecity in effect leads to inhibition of the polymerization reaction.

A facile process for polymerization, which does not involve the use of degradation agents for passivating the surfactants is highly desirable for reducing costs, time duration and complexity of the polymerization process.

In prior art there were carboxyluc acid type surfactant and other type of surfactant, there was a need to establish use of a non fluorinated sulfonate type hydrocarbon containing surfactant in fluoropolymerisation process.

Further, there is a need for a process for preparing fluoropolymers and fluoroelastomers having low to high molecular weights, using non-fluorinated surfactants, which is devoid of passivating the surfactant.

OBJECTIVES OF THE INVENTION

The main objective of the invention is to overcome the aforestated problems in the prior art. The other objective of the present invention is to provide a process for the aqueous dispersion polymerization of fluoromonomers and fluoroelastomers using non-fluorinated surfactants.

Yet another objective of the present invention is to provide a process for the aqueous dispersion polymerization of tetrafluoroethylene and other monomers using non-fluorinated hydrocarbon containing sulfonate type surfactant.

It is yet another objective of the invention to provide a simplified one step process for the preparation of fluoropolymers and fluoroelastomers.

It is another objective of the invention to provide a process for preparing fluoropolymers and fluoroelastomers, which is devoid of the step of passivating the surfactants.

It is another objective of the invention to provide a process for preparing fluoropolymers and fluoroelastomers, with optimum particle size.

Yet another objective of the present invention is to provide a fluoropolymer and fluoroelastomers dispersion comprising non-fluorinated hydrocarbon containing sulfonate type surfactant.

Yet another objective of the present invention is to produce low to high molecular weight fluoropolymers using non-fluorinated surfactants.

It is another objective of the present invention to provide a fluoropolymer resin obtained by aqueous polymerization using non-fluorinated hydrocarbon containing sulfonate type surfactant.

SUMMARY OF THE INVENTION

The present invention relates to a process for preparing high molecular weight fluoropolymers using a non fluorinated disulfonate type hydrocarbon containing surfactant. More particularly, the present invention relates to a method of aqueous dispersion polymerization using a non-fluorinated hydrocarbon containing sulfonate type surfactant.

In accordance with an embodiment of the invention, there is provided a process for preparing a fluoropolymer in an aqueous dispersion wherein the surfactant is a non fluorinated, hydrocarbon containing sulfonate type surfactant represented by formula (1)

$$R_1—[Ar_nX_{n-1}]—(SO_3M^+)_m \quad (1)$$

with:

R being an alkyl group consisting of a number of 2 to 20 carbon atoms;

l being an alkyl group varying from integer from 1 to 2

Ar being an aryl group;

n being an integer ranging from 1 to 2;

X being a bridging between aryl groups Ar, wherein the bridging is $CH_2$ or linkage by either an ether or an amine function or N $(C_2H_5)_3$ or carbonyl group (C=O) $M^+$ being a monovalent cation consisting of hydrogen, an alkali metal, $NH_4^+$ or combinations thereof; and m being an integer ranging from 1 to 2.

In accordance with another embodiment of the invention, there is provided a process for preparing a fluoropolymer in an aqueous medium, said process comprising the steps of:

i. forming an aqueous solution comprising the surfactant in a polymerization reactor;

ii. pressurizing the polymerization reactor with the fluoromonomer to form the aqueous dispersion;

iii. initiating a polymerization reaction of the fluoromonomer by adding an initiator into the polymerization reactor;

iv. propagating the polymerization reaction for growth of chain length of the fluoropolymer and/or fluoroelastomer; and v. termination of the polymerization reaction after consumption of a desired quantity of fluoromonomers.

wherein the non-fluorinated, hydrocarbon containing, sulfonate type surfactant comprises 18 to 36 carbon atoms, wherein the molecular weight of the fluoropolymer ranges from $1 \times 10^3$ to $9 \times 10^8$ g/mol and wherein said process is devoid of passivating the surfactant.

The surfactant is added in one shot into the reactor or is metered into the polymerization reactor during the propagation of polymerization reaction at a pre-determined rate.

The a non-fluorinated, hydrocarbon containing, sulfonate type surfactant in accordance with an embodiment has a structure represented by Formula 2;

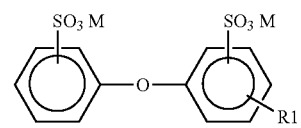

Formula 2

In accordance with another embodiment, R is an alkyl group and M is a monovalent cation selected from the group consisting of hydrogen ions, alkali metal ions and ammonium ions. Preferably, R may be a branched alkyl group or a linear alkyl group. Preferably, M is selected from the group consisting of potassium, sodium and ammonium.

In accordance with the embodiment of the invention there is provided a process for polymerizing fluoromonomer to fluoropolymer and/or fluoroelastomer in an aqueous dispersion in presence of a surfactant having formula 3

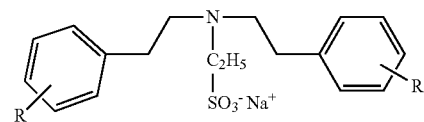

Wherein R being an alkyl group consisting of a number of 2 to 20 carbon atoms;

In another embodiment of the invention there is provided a process for polymerizing fluoromonomer to fluoropolymer and/or fluoroelastomer in an aqueous dispersion in presence of a surfactant represented by formula (4)

Wherein R being an alkyl group consisting of a number of 2 to 20 carbon atoms.

In another embodiment of the invention there is provided a process for polymerizing fluoromonomer to fluoropolymer and/or fluoroelastomer in an aqueous dispersion in presence of a surfactant represented by formula (5)

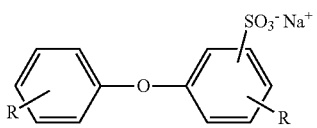

Wherein R being an alkyl group consisting of a number of 2 to 20 carbon atoms.

In another embodiment of the invention there is provided a process for polymerizing fluoromonomer to fluoropolymer and/or fluoroelastomer in an aqueous dispersion in presence of a surfactant represented by formula (6)

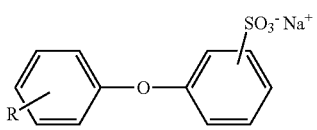

Wherein R being an alkyl group consisting of a number of 2 to 20 carbon atoms

In another embodiment of the invention there is provided a process for polymerizing fluoromonomer to fluoropolymer and/or fluoroelastomer in an aqueous dispersion in presence of a surfactant represented by formula (7)

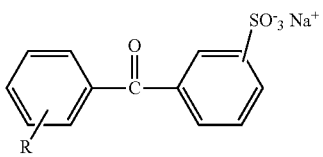

Wherein R being an alkyl group consisting of a number of 2 to 20 carbon atoms

In another embodiment of the invention there is provided a process for polymerizing fluoromonomer to fluoropolymer and/or fluoroelastomer in an aqueous dispersion in presence of a surfactant represented by formula (8)

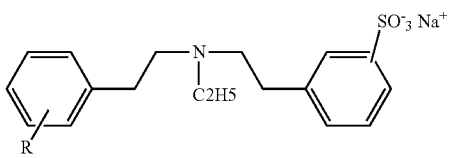

Wherein R being an alkyl group consisting of a number of 2 to 20 carbon atoms

In accordance with still another embodiment, the aqueous emulsion comprises an initiator, for initiating the polymerization process, selected from the group consisting of Disuccinic Acid Peroxide (DSAP), Ammonium Persulphate (APS), redox initiators and combinations thereof.

In accordance with an embodiment, the concentration of the surfactant is 700 to 1200 ppm based on the weight of the fluoropolymer. Preferably, the surfactant is added to the reaction mixture at a rate of 0.008 g/(L*h) to 0.6 g/(L*h).

In an embodiment, the solid content of the reaction mixture on completion of the polymerization process ranges from 20 to 35%.

The aqueous emulsion may further comprise stabilizing agents such as paraffin wax, nucleation agents and reducing agents.

To further clarify advantages and features of the present invention, a more particular description of the invention will be rendered by reference to specific embodiments thereof, which is illustrated in the appended drawings. It is appreciated that these drawings depict only typical embodiments of the invention and are therefore not to be considered limiting its scope. The invention will be described and explained with additional specificity and detail with the accompanying drawings.

BRIEF DESCRIPTION OF THE ACCOMPANYING DRAWINGS

The above and other features, aspects, and advantages of the subject matter will be better understood with regard to the following description and accompanying drawings.

FIG. 1. Flowchart for the process for a process for preparing a fluoropolymer in an aqueous dispersion using a non-fluorinated hydrocarbon containing sulfonate type surfactant according to embodiment of the invention.

DETAILED DESCRIPTION OF THE INVENTION

For the purpose of promoting and understanding of the principles of the invention, reference will now be made to the embodiment illustrated in the drawings and specific language will be used to describe the same. It will nevertheless be understood that no limitation of the scope of the invention is thereby intended, such alterations and further modifications in the illustrated system, and such further applications of the principles of the invention as illustrated therein being contemplated as would normally occur to one skilled in the art to which the invention relates.

Discussed below are some representative embodiments of the present invention. The invention in its broader aspects is not limited to the specific details and representative methods. Illustrative examples are described in this section in connection with the embodiments and methods provided.

It is to be noted that, as used in the specification, the singular forms "a," "an," and "the" include plural referents unless the context clearly dictates otherwise. Thus, for example, reference to a composition containing "a compound" includes a mixture of two or more compounds. It should also e noted that the term "or" is generally employed in its sense including "and/or" unless the content clearly dictates otherwise.

The expression of various quantities in terms of "%" or "% w/w" means the percentage by weight of the total solution or composition unless otherwise specified.

All cited references are incorporated herein by reference in their entireties. Citation of any reference is not an admission regarding any determination as to its availability as prior art to the claimed invention.

It will be understood by those skilled in the art that the foregoing general description and the following detailed description are explanatory of the invention and are not intended to be restrictive thereof.

Reference throughout this specification to "an aspect", "another aspect" or similar language means that a particular feature, structure, or characteristic described in connection with the embodiment is included in at least one embodiment of the present invention. Thus, appearances of the phrase "in an em odiment", "in another embodiment" and similar language throughout this specification may, but do not necessarily, all refer to the same embodiment.

The terms "comprises", "comprising", or any other variations thereof, are intended to cover a non-exclusive inclusion, such that a process or method that comprises a list of steps does not include only those steps but may include other steps not expressly listed or inherent to such process or method.

Unless otherwise defined, all technical and scientific terms used herein have the same meaning as commonly understood by one of ordinary skill in the art to which this invention belongs. The system, methods, and examples provided herein are illustrative only and not intended to be limiting.

Embodiments of the present invention will be described below in detail with reference to the accompanying drawing.

The present invention, in all its aspects, is described in detail as follows:

As discussed above, Perfluoroalkylated substances (PFAS), such as Perfluorinated surfactants, for example PFOA, are banned under REACH 2020 guidelines of the European Chemicals Agency. Non-fluorinated surfactants on the other hand inhibit the polymerization reaction and afford low molecular weight fluoropolymers, necessitating passivation of the surfactants using degradation agents. In view of the 10 aforesaid challenges, the inventors of the present invention have developed a novel process for preparing fluoromonomers of low to high molecular weight. Said process comprising the steps of:
a) forming an aqueous solution comprising the surfactant in a polymerization reactor;
b) pressurizing the polymerization reactor with the fluoromonomer to form the aqueous dispersion;
c) initiating a polymerization reaction of the fluoromonomer by adding an initiator into the polymerization reactor;
d) propagating the polymerization reaction for growth of chain length of the fluoropolymer and/or fluoroelastomer; and
e) termination of the polymerization reaction after consumption of a desired quantity of fluoromonomers.
wherein the non-fluorinated, hydrocarbon containing, sulfonate type surfactant consists of 18 to 33 carbon atoms. Wherein the molecular weight of the fluoropolymer ranges from $1 \times 10^3$ to $9 \times 10^8$ g/mol and wherein the process is devoid of passivating the surfactant.

The aqueous emulsion formed in the present invention may comprise of surfactants, fluoromonomers, initiators, nucleation agents, and reducing agents.

Surfactant

The term "surfactant" means a type of molecule which has both hydrophobic and hydrophilic portions, which allows it to stabilize and disperse hydrophobic molecules and aggregates of hydrophobic molecules in aqueous systems. A preferred group of
surfactants for fluoropolymer and fluoroelastomers synthesis according to the embodiments of the present invention include non-fluorinated, hydrocarbon containing, sulfonate type surfactant more preferably non-fluorinated, hydrocarbon containing anionic sulfonate type surfactant. In an embodiment non-fluorinated, hydrocarbon containing anionic sulfonate type surfactant may be alkyl diphenyloxide anion surfactant.

In an embodiment, the surfactant is a non fluorinated, hydrocarbon containing sulfonate type surfactant represented by formula (1)

$$R_1\text{—}[Ar_nX_{n-1}]\text{—}(SO_3M^+)_m \quad (1)$$

with:
R being an alkyl group consisting of a number of 2 to 20 carbon atoms;
l being an integer from 1 to 2.
Ar being an aryl group;
n being an integer ranging from 1 to 2;
X being a bridging between aryl groups Ar, wherein the bridging is $CH_2$ or
linkage by either an ether or an amine function or $N(C_2H_5)_3$; or carbonyl group (C=O)
$M^+$ being a monovalent cation consisting of hydrogen, an alkali metal, $NH_4^+$ or combinations thereof; and
m being an integer ranging from 1 to 2.

In an embodiment, the surfactant may have Formula 2 having 28 carbon atoms, wherein R is an alkyl group and M is a monovalent cation selected from the group consisting of hydrogen ions, alkali metal ions and ammonium ions.

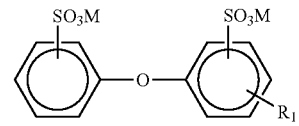

Formula 2

In a preferred embodiment the anionic surfactants are in form of an acid or salt thereof. The anionic surfactant has a counter anion M. Preferably, M can be potassium, sodium or ammonium. Examples of fluorinated surfactants useful for the present invention include Ammonium or potassium or sodium salts of Formula 1 acids.

An example of the non-fluorinated, hydrocarbon containing, sulfonate type surfactant may be represented by the Formula 2 as following example

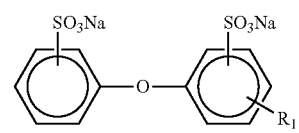

Wherein R being an alkyl group consisting of a number of 2 to 20 carbon atoms.

In a preferred embodiment, the surfactant may be is represented by formula (3):

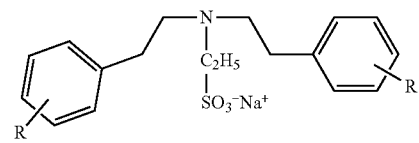

Formula 3

Wherein R being an alkyl group consisting of a number of 2 to 20 carbon atoms.

In a preferred embodiment, the surfactant for the emulsion polymerization of fluoromonomers by the process of the present invention is represented by Formula 4.

Formula 4

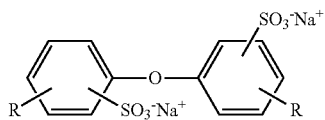

wherein R being an alkyl group consisting of a number of 2 to 20 carbon atoms.

A co-surfactant may be used in the process of the present invention along with the aforesaid surfactants.

In an embodiment, the non-fluorinated, hydrocarbon containing, sulfonate type surfactant may have following formula Formula 5

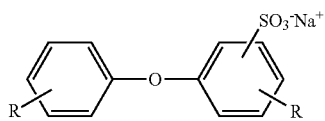

Wherein R being an alkyl group consisting of a number of 2 to 20 carbon atoms.

In an embodiment, the non-fluorinated, hydrocarbon containing, sulfonate type surfactant may have following formula Formula 6

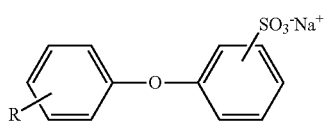

Wherein R being an alkyl group consisting of a number of 2 to 20 carbon atoms.

In another embodiment of the invention there is provided a process for polymerizing fluoromonomer to fluoropolymer and/or fluoroelastomer in an aqueous dispersion in presence of a surfactant represented by formula (7)

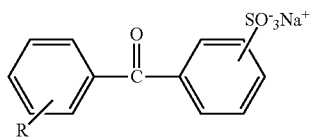

Wherein R being an alkyl group consisting of a number of 2 to 20 carbon atoms.

In another embodiment of the invention there is provided a process for polymerizing fluoromonomer to fluoropolymer and/or fluoroelastomer in an aqueous dispersion in presence of a surfactant represented by formula (8)

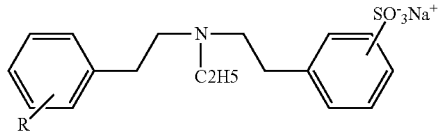

Wherein R being an alkyl group consisting of a number of 2 to 20 carbon atoms.

Fluoromonomers

The term "fluoromonomer" or the expression "fluorinated monomer" means a polymerizable alkene which contains at least one fluorine atom, fluoroalkyl group, or fluoroalkoxy group attached to the double bond of the alkene that undergoes polymerization. The term "fluoropolymer" and fluoroelastomers means a polymer or elastomer formed by the polymerization of at least one fluoromomer, and it is inclusive of homopolymers, copolymers, terpolymers and higher polymers. Examples of fluoromonomers that can be used in the present invention include but not limited to tetrafluoroethylene (TFE), Hexa Fluopropylene (HFP), Polypropyl vinyl Ether (PPVE), Polymethyl Vinyl Ether (PMVE), chlorotrifluoroethylene (CTFE), vinylidene fluoride (VDF), vinylfluoride (VF), and so forth, each of which can be used individually or in combination. Preferably, the fluoromonomer is tetrafluoroethylene (TFE) and the fluoropolymer is polytetrafluoroethylene (PTFE). Although, the embodiments of the present invention are described in terms of polymerization of TFE, the process described herein can be applied to the polymerization of any fluoromonomer.

The aqueous emulsion may further comprise of an initiator for initiating the polymerization process.

Initiators

The term "initiator" and the expressions "radical initiator" and "free radical initiator" refer to a chemical that is capable of providing a source of free radicals, either induced spontaneously, or by exposure to heat or light. Examples of suitable initiators include peroxides, peroxy dicarbonates and azo compounds. Initiators may also include reduction-oxidation systems which provide a source of free radicals. The term "radical" and the expression "free radical" refer to a chemical species that contains at least one unpaired electron. The radical initiator is added to the reaction mixture in an amount sufficient to initiate and maintain the polymerization reaction rate. The radical initiator may comprise a persulfate salt, such as sodium persulfate, potassium persulfate, or ammonium persulfate. Alternatively, the radical initiator may comprise a redox system. "Redox system" is understood by a person skilled in the art to mean a system comprising an oxidizing agent, a reducing agent and optionally, a promoter as an electron transfer medium. In a preferred embodiment, the radical initiator is selected from the group consisting of Disuccinic Acid Peroxide (DSAP), Ammonium Persulphate (APS), redox initiator and combinations thereof.

Chain Transfer Agents

Chain transfer agents, also referred to as modifiers or regulators, comprises of at least one chemically weak bond. A chain transfer agent reacts with the free-radical site of a growing polymer chain and halts an increase in chain length. Chain transfer agents are often added during emulsion polymerization to regulate chain length of a polymer to achieve the desired properties in the polymer. Examples of chain transfer agents that can be used in the present invention include, but not limited to, halogen compounds, hydrocarbons in general, aromatic hydrocarbons, thiols (mercaptans), alcohols and so forth; each of which can be used individually or in combination.

Nucleation Agents

A nucleation agents represents yet another important component used in emulsion polymerization of fluoromonomers. The use of nucleation agent generates a large number of free radial sites, which are dispersed in polymerization reactor. These numerous free radical sites counter the telogenic or inhibition effect of the non-fluorinated surfactant on polymerization. Generally, non-fluorinated surfactants inherently inhibit the free radical site to react further or participate in polymerization reaction due to telogenicity. Addition of nucleation agent promotes the polymerization process even at low concentrations of the initiator. In a nutshell, nucleation agent reduces the inhibition effect of non-fluorinated surfactants on polymerization rates, leads to lower consumption of initiators and higher molecular weights of the fluoropolymers. The term "nucleation agent" as used in the present invention refers to the combination of the non-fluorinated anionic surfactant and a redox system comprising oxidizing agents such as ammonium persulfate, potassium persulfate, and Potassium permanganate, etc.; and reducing agents such as sodium sulfite, sodium bisulfite, oxalic acid, etc.

Reducing Agents

As discussed above reducing agents form a part of the nucleation agent, which counter the telogenic effect of non-fluorinated surfactants on the polymerization process. They act in conjunction with oxidizing agents such as ammonium persulfate and generate free radicals at very low to high reaction temperatures, thereby accelerating the polymerization reaction. Examples of reducing agents useful in the present invention include, but not limited to sodium sulfite, sodium bisulfite, sodium acetate, oxalic acid and so forth, each of which can be used independently or in combination.

Polymerization Conditions

The temperature used for polymerization may vary, for example, from 20 to 120° C., depending on the initiator system chosen and the reactivity of the fluoromonomer(s) selected. In a preferred embodiment, the polymerization is carried out at a temperature in the range of 65 to 110° C.

The pressure used for polymerization may vary from 2-200 bar, depending on the reaction equipment, the initiator system, and the monomer selection. In a preferred embodiment the reaction is carried out at a pressure in the range of 10 to 60 bar.

The polymerization occurs under stiffing or agitation. The stiffing may be constant, or may be varied to optimize process conditions during the course of the polymerization. In one embodiment, both multiple stirring speeds and multiple temperatures are used for controlling the reaction.

According to one embodiment of the process of the invention, a pressurized polymerization reactor equipped with a stirrer and heat control means is charged with water, preferably deionized water, non-fluorinate, hydrocarbon containing, sulfonate type surfactant in accordance with the invention, nucleation agent, reducing agent, chain transfer agents and at least one fluoromonomer.

Preferably, the hydrocarbon containing, sulfonate type surfactant is added in an amount in the range from 40 to 3900 ppm (1 to 100 g), more preferably from 200 to 2000 ppm (5 to 50 g), based on the weight of fluoropolymer dispersion. In a preferred embodiment, the dosing rate of the non-fluorinate hydrocarbon containing, sulfonate type surfactant during the course of the polymerization reaction ranges from 0.008 g/(L*h) to 0.6 g/(L*h). Preferably, the reaction mixture comprises chain transfer agents in an amount in the range from 100 to 4500 ppm (0.5 to 40 g). The mixture may optionally contain paraffin wax. The reactor is then heated up to the reaction temperature and pressurized. Thereafter initiators are added into the reaction vessel to initiate the polymerization reaction. Preferably, the initiator is added in an amount in the range from 2 to 1500 ppm, based on the weight of de-ionized water. Prior to introduction of the surfactant, and monomer or monomers into the reaction vessel and commencement of the reaction, air is preferably removed from the reactor in order to obtain an oxygen-free environment for the polymerization reaction. Preferably, the oxygen is removed from the reaction vessel until its concentration is less than 10 ppm. The reactor may also be purged with a neutral gas such as, for example, nitrogen or argon.

Upon completion of the polymerization reaction, the reactor is brought to ambient temperature and the residual unreacted monomer is vented to atmospheric pressure. The aqueous reaction medium containing the fluoropolymer is then recovered from the reaction vessel. Preferably, the solid content ranges from 10 to 65%, more preferably from 20 to 25% and the particle size of the fluoropolymer particles preferably ranges from 50 to 300 nm.

The present invention is more particularly described in the following examples that are intended as illustration only, since numerous modifications and variations within the scope of the present invention will be apparent to those of skill in the art. Unless otherwise noted, all parts, percentages, and ratios reported in the following examples are on a weight basis, and all reagents used in the examples were obtained or are available from the chemical suppliers.

The following examples illustrates the basic methodology and versatility of the present invention.

EXAMPLE

The polymerization process was carried out in a 150 L polymerization reactor with 60 to 130 L of de-ionized water. Nucleation agent, which is a combination of the surfactant and redox system in an amount 3 to 200 ppm (0.1 to 5 g) was added into the polymerization reactor. Oxygen was removed from the reactor until its concentration was less than 10 ppm. The reaction mixture was then agitated at 30 to 70 rotations per minute and 50 to 1000 mL of Ammonium Persulphate (APS) solution (0.5 g/L) was added, to obtain 0.4 to 200 ppm (0.01 to 5 g) concentration.

The pressure in the polymerization reactor is then increased to 15 to 60 bar by adding tetrafluoroethylene monomer. After that, 0.01 to 5 g of non-fluorinated alkyl-diphenyloxide surfactant was added. A mixture of 0 to 450 ppm (0 to 30 g) of Ammonium Persulphate (APS) and 0 to 6000 ppm (0 to 400 g) of Disuccinic Acid Peroxide (DSAP) was added in the polymerization reactor to initiate the reaction. The reaction temperature was maintained in the range of 65 to 110° C. and the pressure was maintained in the range of 10 to 60 bar. A pressure drop in the range of 0.1 to 2 bar, corresponding to consumption of 0.1 to 3 kg of TFE, indicates kick-off of the reaction. After kick-off of the reaction, metering of the surfactant solution was carried out at the rate of 1 to 100 ml/min, the concentration of the surfactant solution ranging from 5 to 5000 ppm (0.0005 to 5%). The total amount of non-fluorinated alkyldiphenyloxy surfactant in the reaction mixture ranged from 40 to 8400 ppm (1 to 200 g) based on the weight of the fluoropolymer.

During the polymerization reaction, lasting for a period ranging from 20 to 700 minutes, a total of 10 to 45 kg of TFE were consumed, to afford PTFE particles with particle size ranging from 50 to 300 nm and molecular weight ranging from $2 \times 10^5$ to $9 \times 10^8$ g/mol and a solids content ranging from 10 to 65%.

In order to carry out the invention and validate it, various following experiments were conducted.

Experiments 1

This contains experiments of polymerization with delayed addition of the hydrocarbon surfactant and its metering into the polymerization reactor and improvements obtained when the kick off of the polymerization reaction was preceded by the formation of a dispersion of oleophilic nucleation sites, with and without the presence of salt. The general procedure for polymerization with no nucleation site formation step prior to polymerization kick-off: To 150 L (litres), horizontally disposed, jacketed, stainless steel reactor with a six-blade agitator is added 70 litres of deionized, deaerated water and 3 kg of liquid wax. The reactor was sealed and placed under vacuum till the oxygen level reached to less than 10 ppm. The reactor pressure is raised to 1 kg/cm2 (103.2 kPa) with nitrogen and brought to vacuum 5 times. Reactor agitator was set at 50 RPM.

After vacuum nitrogen cycles non-fluorinated surfactant 0.27 gm and 0.5 gm sodium sulfite were added and followed by 0.27 gm ammonium persulfate (APS) into reactor before pressurization. The reactor was then heated to 90° C. and TFE was charged to the reactor to bring the reactor pressure to 24 kg/cm2 (2.35 MPa). At time Zero, 500 ml of initiator solution of deionized, deaerated water containing 0.938gm of ammonium persulfate (APS) and 36 gm of disuccinic acid peroxide (DSAP) was injected at 200 ml/min.

TFE was filled into reactor to 24 Kg/cm$^2$ (2.35 MPa) pressure and maintained at that pressure for the duration of the polymerization. After 1.3 kg of TFE was fed since kick-off, a stabilizer surfactant solution was pumped to the reactor at the rate of 15 ml/min, which corresponds to a surfactant metering rate of 0.06 g/l-hr.

After 24 kg of TFE had been added to the reactor since kick off, the Batch Time (Table A) was recorded, the agitator was stopped, the reactor was vented to atmospheric pressure and the dispersion was discharged. Upon cooling, wax was separated from the dispersion.

Experiments 2-3

In these experiments, the polymerization with delayed addition of the hydrocarbon surfactant were done and its metering into the polymerization reactor and improvements obtained when the kick off of the polymerization reaction was preceded by the formation of a dispersion of oleophilic nucleation sites, with and without the presence of salt. The general procedure for polymerization was done with no nucleation site formation step prior to polymerization kick-off: To 150 litres, horizontally disposed, jacketed, stainless steel reactor with a six-blade agitator is added 70 litres of deionized, deaerated water and 3 kg of liquid wax. The reactor was sealed and placed under vacuum till the oxygen level reached to 10 ppm. The reactor pressure was raised to 1 kg/cm2 (103.2 kPa) with nitrogen and brought to vacuum 5 times. Reactor agitator was set at 50 RPM.

After vacuum nitrogen cycles non-fluorinated surfactant 0.27 gm and 0.5 gm sodium sulfite were added and followed by 0.27 gm ammonium persulfate (APS) into reactor before pressurization. The reactor was heated to 90° C. and TFE was charged to the reactor to bring the reactor pressure to 24 kg/cm2 (2.35 MPa). At time Zero, 500 ml of initiator solution of deionized, deaerated water containing 36gm of disuccinic acid peroxide (DSAP) was injected at 200 ml/min TFE was filled into reactor to 24 kg/cm2 (2.35 MPa) pressure and maintained at that pressure for the duration of the polymerization.

After 1.3 kg of TFE was fed since kick-off, a stabilizer surfactant solution is pumped to the reactor at the rate of 15 ml/min, which corresponds to a surfactant metering rate of 0.06 g/l-hr. After 24 kg of TFE has been added to the reactor since kick off, the Batch Time (Table A) is recorded, the agitator is stopped, the reactor is vented to atmospheric pressure and the dispersion is discharged. Upon cooling, wax is separated from the dispersion.

Experiment-4

This Experiment contains experiments of polymerization with delayed addition of the hydrocarbon surfactant and its metering into the polymerization reactor and improvements obtained when the kick off of the polymerization reaction is preceded by the formation of a dispersion of oleophilic nucleation sites, with and without the presence of salt.

General procedure for polymerization with no nucleation site formation step prior to polymerization kick-off: To 150 litres, horizontally disposed, jacketed, stainless steel reactor with a six-blade agitator was added 70 litres of deionized, deaerated water and 3 kg of liquid wax. The reactor was sealed and placed under vacuum till the oxygen level reached to less than 10 ppm. The reactor pressure was raised to 1 kg/cm2 (103.2 kPa) with nitrogen and brought to vacuum 5 times. Reactor agitator was set at 50 RPM. The reactor was heated to 90° C. and TFE is charged to the reactor to bring the reactor pressure to 24 kg/cm2 (2.35 MPa).

At time Zero, 500 ml of initiator solution of deionized, deaerated water containing 36 gm of disuccinic acid peroxide (DSAP) was injected at 200 ml/min. TFE was filled into reactor to 24 kg/cm2 (2.35 MPa) pressure and maintained at that pressure for the duration of the polymerization.

After 0.5 kg of TFE is fed since kick-off, a stabilizer surfactant solution was pumped to the reactor at the rate of 15 ml/min, which corresponds to a surfactant metering rate of 0.06 g/l-hr. After 24 kg of TFE had been added to the reactor since kick off, the Batch Time (Table A) was recorded, the agitator was stopped, the reactor was vented to atmospheric pressure and the dispersion is discharged. Upon cooling, wax was separated from the dispersion.

Experiment:6-7

These Experiments contains experiments of polymerization with delayed addition of the hydrocarbon surfactant and its metering into the polymerization reactor and improvements obtained when the kick off of the polymerization reaction is preceded by the formation of a dispersion of oleophilic nucleation sites, with and without the presence of salt. General procedure for polymerization with no nucleation site formation step prior to polymerization kick-off: To 150 litres, horizontally disposed, jacketed, stainless steel reactor with a six-blade agitator was added 70 L (litres) of deionized, deaerated water and 3 kg of liquid wax. The reactor was sealed and placed under vacuum till the oxygen level had reached to less than 10 ppm.

The reactor pressure was raised to 1 kg/cm2 (103.2 kPa) with nitrogen and brought to vacuum 5 times. Reactor agitator was set at 50 RPM. After vacuum nitrogen cycles non-fluorinated surfactant 5 gm into reactor before pressurization. The reactor was heated to 90° C. and TFE is charged to the reactor to bring the reactor pressure to 24 kg/cm2 (2.35 MPa).

At time Zero, 1000 ml of initiator solution of deionized, deaerated water containing 6 to 7 gm of ammonium persulfate (APS) and 40-46.5 gm of disuccinic acid peroxide (DSAP) was injected at 250 ml/min TFE was filled into reactor to 24 kg/cm2 (2.35 MPa) pressure and maintained at that pressure for the duration of the polymerization.

After 3-3.5 kg of TFE is fed since kick-off, a stabilizer surfactant solution was pumped to the reactor at the rate of 15 ml/min, which corresponds to a surfactant metering rate of 0.06 g/l-hr. After 24 kg of TFE had been added to the reactor since kick off, the Batch Time (Table-A) is recorded, the agitator was stopped, the reactor was vented to atmospheric pressure and the dispersion is discharged. Upon cooling, wax was separated from the dispersion.

| | | Experiment-1 | Experiment-2 | Experiment-3 | Experiment-4 | Experiment-5 | Experiment-6 | Experiment-7 |
|---|---|---|---|---|---|---|---|---|
| Status | | completed | Completed | completed | completed | Completed | Completed | completed |
| Total capacity | liters | 150 | 150 | 150 | 150 | 150 | 150 | 150 |
| Working capacity | liters | 130 | 130 | 130 | 130 | 130 | 130 | 130 |
| Preparation work | | | | | | | | |
| DI Water | Kg | 70 | 70 | 70 | 70 | 70 | 70 | 70 |
| wax | Kg | 3 | 3 | 3 | 3 | 3 | 3 | 3 |
| O2 removal | PPM | ≤10 | ≤10 | ≤10 | ≤10 | ≤10 | ≤10 | ≤10 |
| Heating | °C. | 80 | 80 | 80 | 80 | 80 | 80 | 80 |
| agitation | rpm | 50 | 50 | 50 | 50 | 50 | 50 | 50 |
| Surfactant | gm | 0.27 | 0.27 | 0.27 | 0.27 | — | 5 | 5 |
| APS | gm | 0.27 | 0.27 | 0.27 | 0.27 | — | — | — |
| Sodium sulfite | gm | 0.5 | 0.5 | 0.5 | 0.5 | — | — | — |
| Reaction pressure | bar | 24 | 24 | 24 | 24 | 24 | 24 | 24 |
| Initiator | | | | | | | | |
| DSAP | g | 18.75 | 36 | 36 | 36 | 36 | 46.5 | 40 |
| APS | g | 0.938 | | | | | 7 | 6 |
| Pressure Drop-KO | bar | 0.7 | 0.7 | 0.7 | 0.7 | 0.7 | 0.7 | 0.7 |
| KO quantity of TFE | kg | 1.3 | 1.3 | 1.3 | 1.3 | 0.5 | 3 | 3.5 |
| Surfactant dosed into reactor | gm | 17.7 | 25.4 | 18.3 | 27.5 | 25.3 | 18.3 | 19.2 |
| Polymerisation | | | | | | | | |
| Reaction Start Temp | °C. | 80 | 80.7 | 82.73 | 80 | 83.58 | 89.5 | 92.18 |
| Total TFE consumption | Kg | 24 | 26 | 26 | 26 | 24 | 24 | 24 |
| Reaction end temperature | °C. | 82.5 | 87.9 | 90 | 85 | 86.20 | 89.86 | 90.25 |
| Total Reaction Time | min | 146 | 180 | 172 | 146 | 152 | 187 | 160 |
| Results on Liquids | | | | | | | | |
| Latex Conc | % | 22.62 | 25.79 | 21.8 | 22.9 | 26.05 | 24.49 | 25.00 |
| LPS | nm | 228.3 | 223.3 | 232.1 | 249 | 234.1 | 174.6 | 182.1 |
| pH | | 3.04 | 2.86 | 2.98 | 3.28 | 2.72 | 2.88 | 2.96 |
| Solid Content | % | 22.70 | 25.85 | 21.95 | 22.99 | 26.10 | 24.63 | 25.12 |
| stability by agitation | Min | 0.32 | 0.26 | 0.3 | 0.4 | 0.34 | 0.28 | 0.40 |
| SSG | | 2.168 | 2.165 | 2.175 | 2.163 | 2.157 | 2.197 | 2.196 |
| ESG | | 2.194 | 2.188 | 2.205 | 2.190 | 2.233 | 2.239 | 2.243 |
| TII | | 26 | 25 | 30 | 27 | 76 | 42 | 47 |

-continued

|  |  | Experiment-1 | Experiment-2 | Experiment-3 | Experiment-4 | Experiment-5 | Experiment-6 | Experiment-7 |
|---|---|---|---|---|---|---|---|---|
| Extrusion pressure (400:1) | MPa | 32.07 | 35.72 | 30.39 | 29.71 | 23.58 | 36.98 | NA |
| DSC (1st peak) | Celcius | 344.45 | 343.83 | 339.22 | 344.83 | 336.88 | 334.33 | 330.8 |
| DSC (2st peak) | Celcius | 327.17 | 327.23 | 327.53 | 327.33 | 327.24 | 327.32 | 327.56 |
| Tensile strength | MPa | 32.24 | 30.12 | 31.25 | 32.43 | 30.22 | 25.12 | 29.72 |
| Elongation at break | % | 310.5 | 299.6 | 351.7 | 346.6 | 290.5 | 316.6 | 349.6 |

The various properties in the present invention may be measured by using following methods:

1) Latex Particle Size

Latex particle size may be measured to measure the particle size of dispersed systems from sub-nanometer to several micrometers in diameter. The latex particle size may be measured by using the technique of Dynamic Light Scattering (DLS).

The instrument used to determine the particle size of Fluoropolymer dispersion was HORIBA SZ 100 manufactured by HORIBA Scientific. Particle size analysis was performed by dynamic light scattering (DLS). To perform analysis, first polystyrene corvettes was flushed with water used to dilute the dispersion sample with the help of syringe. Now 0.8 g dispersion sample was taken in the cuvette and make up volume 100 ml by adding water. The cuvette having diluted sample was placed in the instrument chamber for determination of median particle size DV (50). The latex particle size may be measured by using instrument called "Malvern zetasizer".

Further, the Latex concentration may be measured by hydrometer.

2) Determination of Fluoropolymer Content:

The solid content of fluoropolymer in dispersion is calculated by using following equation established in ASTM D4441-15 standard.

$$\text{Fluoropolymer Content (\%)} = \frac{(WD - WA) \times 100}{(WB - WA)}$$

Where,
WA: Weight of Aluminium Petri dish
WB: Weight of Aluminium Petri dish+Fluoropolymer dispersion
WC: Weight of fluoropolymer after drying at 105±5° C.
WD: Weight of fluoropolymer after drying the sample at 380±5° C.

3) pH pH may be measured by using pH-meter. The pH of the dispersion may be determined by ASTM E70 standard using SPECTRA LAB ACCUPH-3 instrument.

4) Standard Specific Gravity (SSG):

Standard specific gravity (SSG) is the property usually used to measure the relative molecular mass of the polymers used in the PTFE industry. SSG shall be determined in accordance with the procedure described in ASTM D4895. To perform the test, sample is allowed to go through sintering and cooling cycle in accordance with the appropriate sintering schedule as described in ASTM D4895. The SSG of unmodified PTFE is inversely related to its molecular mass.

5) ESG (Extended Specific Gravity)

The extended specific gravity gives the indication of thermal stability. It may be measured by ASTM D4895. To determine the ESG, the fluoropolymer specimen is first moulded according to ASTM D4895. For ESG, sample is kept for extended period at sintering temperature as compared to sintering time measurement of SSG.

6) TII (Thermal Instability Index)

The thermal instability index (TII) gives an indication of how a resin resists degradation during extended periods of heating at sintering temperatures. It is measured by ASTM D4895. This test method compares the SSG of a resin to its extended specific gravity. Specimens used to determine ESG are identical to those used to determine SSG, except for the differences in thermal history.

7) Pex (Extrusion Pressure)

The extrusion pressure indicates the extent of fibrillation in fine powder PTFE. Pex may be measured by Jennings vertical paste extruder tested as per ASTM D4895.

8) DSC (Differential Scanning Calorimetry)

It is used to measure melting point. It is also used to measure crystallization characterisetics. It is measured by an Instrument called "DSC Q200 TA". The standard used for determination of melting and crystallization characteristics of fluoropolymer is ASTM D4591. According to the standard, the virgin PTFE sample is heated beyond its melting temperature at specified rate to know the endothermic characteristic of the polymer sample. Then, it is cooled to a temperature well below its melting point to analyse the exothermic characteristic of the sample.

9) Solid Content

The solid content may be measured by ASTM D4441.

10) Tensile Strength

It indicates the amount of stress the material can withstand. The tensile strength is measured by ASTM D4895.

11) Elongation at Break

It indicates the stretching behavior. It is measures by ASTM D4895.

The invention may be embodied in other specific forms without departing from the spirit or essential characteristics thereof. The present embodiments are therefore to be considered in all respects as illustrative and not restrictive.

The drawings and the forgoing description give examples of embodiments. Those skilled in the art will appreciate that one or more of the described elements may well be combined into a single functional element. Alternatively, certain elements may be split into multiple functional elements. Elements from one embodiment may be added to another embodiment. For example, orders of processes described herein may be changed and are not limited to the manner described herein.

Moreover, the actions of any flow diagram need not be implemented in the order shown; nor do all of the acts necessarily need to be performed. Also, those acts that are not dependent on other acts may be performed in parallel with the other acts. The scope of embodiments is by no means limited by these specific examples. Numerous variations, whether explicitly given in the specification or not, such as differences in structure, dimension, and use of material, are possible. The scope of embodiments is at least as broad as given by the following claims.

Benefits, other advantages, and solutions to problems have been described above with regard to specific embodiments. However, the benefits, advantages, solutions to problems, and any component(s) that may cause any benefit, advantage, or solution to occur or become more pronounced are not to be construed as a critical, required, or essential feature or component of any or all the claims.

We claim:

1. A process for polymerizing fluoromonomer to fluoropolymer and/or fluoroelastomer in absence of fluorinated surfactants in an aqueous dispersion medium in presence of a non-fluorinated sulfonate type hydrocarbon surfactant comprised of 18 to 33 carbon atoms represented by formula (1):
with:

$$R_1—[Ar_nX_{n-1}]—(SO_3M^+)_m \quad \text{Formula (1)}$$

R being an alkyl group comprised of a number of 15 to 20 carbon atoms;
l being the number of alkyl groups which varies from an integer from 1 to 2;
Ar being an aryl group;
n being an integer ranging from 1 to 2;
X being a bridging between aryl groups Ar, wherein the bridging is CH2 or linkage by either an ether or an amine function or group (C=O);
M+ being a monovalent cation comprised of hydrogen, an alkali metal, NH4+ or combinations thereof; and
m being an integer ranging from 1 to 2
wherein the process comprising the steps of;
a) forming an aqueous solution comprising stabilizing agent as paraffin wax, initial dose of non-fluorinated sulfonate type hydrocarbon surfactant along with redox system in a polymerization reactor, wherein redox system comprising oxidizing agents selected from ammonium persulfate (APS), potassium persulfate and potassium permanganate; and reducing agents selected from sodium sulfate, sodium bisulfate and oxalic acid;
b) pressurizing the polymerization reactor with fluoromonomers to form an aqueous dispersion;
c) initiating a polymerization reaction of the fluoromonomers by adding an initiator selected from disuccinic acid peroxide (DSAP), ammonium persulfate (APS) and combination thereof into the polymerization reactor;
d) propagation of polymerization reaction for growth of chain length of the fluoropolymer and/or fluoroelastomer by adding the surfactant metered into the polymerization reactor at a rate ranging between 0.01 g/(L*h) to 0.1 g/(L*h) during the polymerization reaction;
e) termination of the polymerization reaction after consumption of desired quantity of fluoromonomers with proviso that fluoropolymerization process is devoid of passivation of surfactant used.

2. The process as claimed in claim 1, wherein the fluoropolymer and/or fluoroelastomer has a molecular weight ranging from $1\times10^3$ to $9\times10^8$ g/mol.

3. The process as claimed in claim 1, wherein the aqueous dispersion contains a solid content ranging from 20-65% after completion of the process and wherein aqueous dispersion comprises a stabilizing agent, in particular paraffin wax.

4. The process as claimed in claim 1, wherein the surfactant is represented by formula (4):

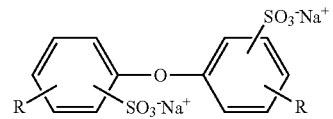

Formula (4)

wherein R is an alkyl group comprised of a number of 15 to 20 carbon atoms.

5. The process as claimed in claim 1, wherein the surfactant is represented by formula (7):

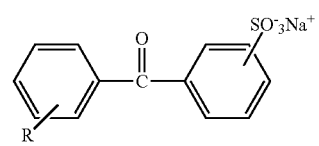

Formula (7)

wherein R is an alkyl group comprised of a number of 15 to 20 carbon atoms.

* * * * *